April 24, 1956 H. C. STRATTON 2,743,067
REEL FOR DEEP-SEA FISHING
Filed July 12, 1952 3 Sheets-Sheet 1
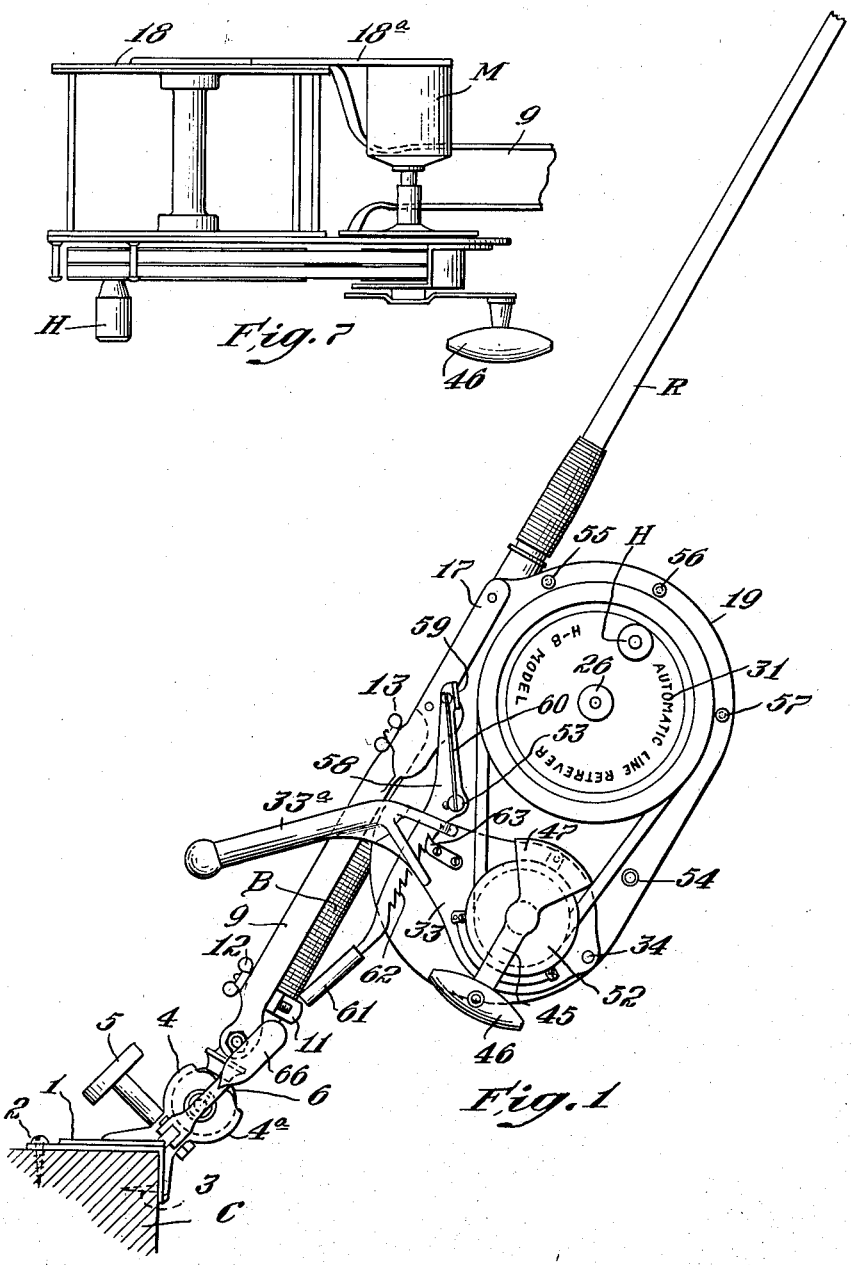
Inventor
Harry C. Stratton
by Roberts Cushman & Grant
Att'ys.

April 24, 1956     H. C. STRATTON     2,743,067
REEL FOR DEEP-SEA FISHING

Filed July 12, 1952     3 Sheets-Sheet 2

Inventor
Harry C. Stratton

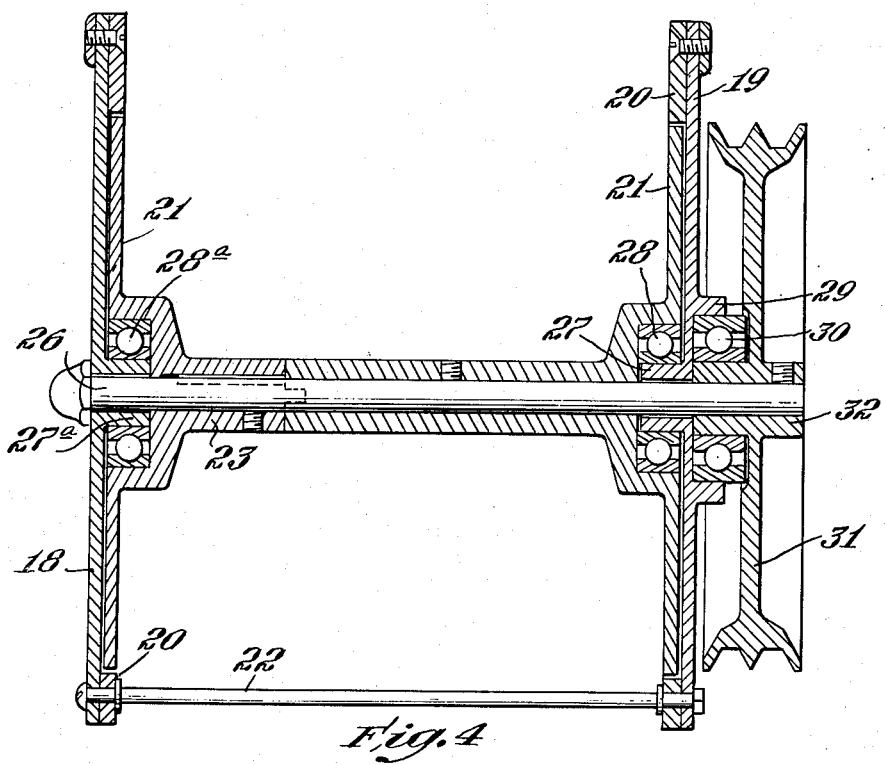
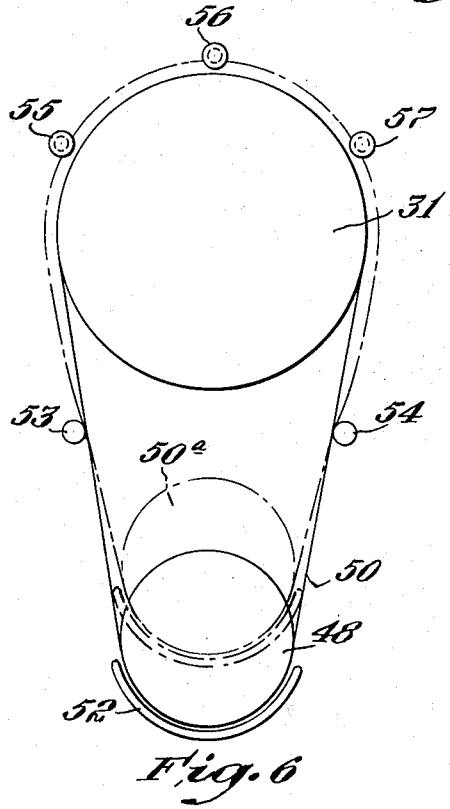
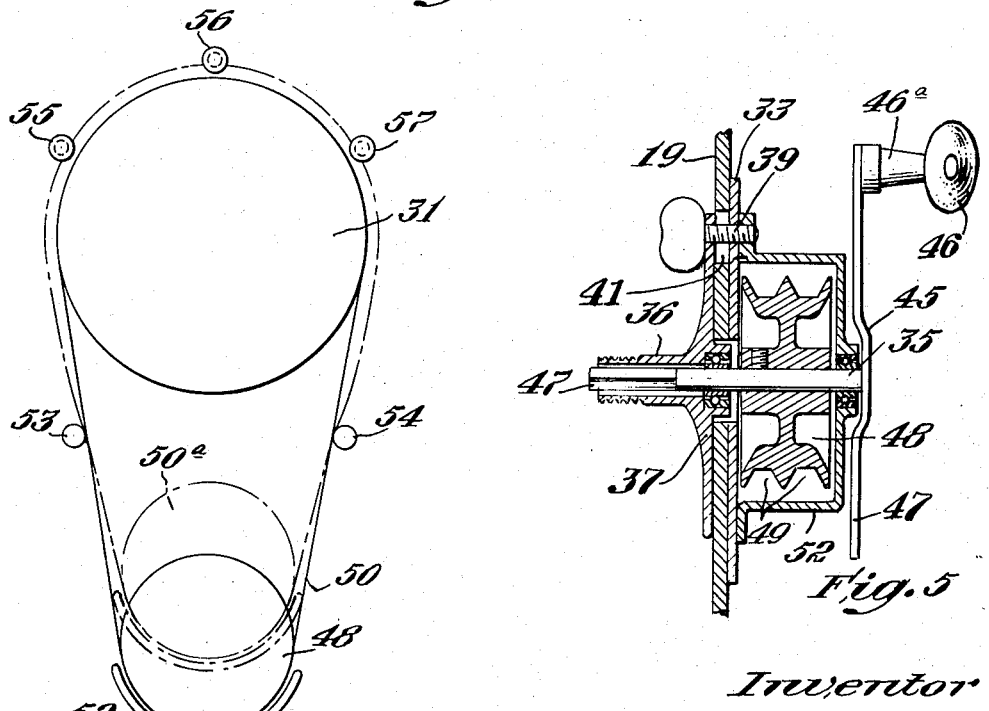

ns Patent Office
2,743,067
Patented Apr. 24, 1956

2,743,067

REEL FOR DEEP-SEA FISHING

Harry C. Stratton, Malden, Mass.

Application July 12, 1952, Serial No. 298,559

5 Claims. (Cl. 242—84.5)

This invention pertains to fish reels, particularly to reels of the kind used in deep-sea fishing for big and gamey fish such as tuna or tarpon. Reels of this type are designed to hold great lengths of heavy line, for example several thousands of feet, and must be of the most rugged construction. Customarily such a reel is mounted on a rod whose butt end is received in a socket carried by a rigid support, for example a chair (fixed to a boat's deck) upon which the fisherman is seated.

In order that the reel drum may be turned to keep the line taut while playing a fish, it is customary to provide toothed gearing between the actuating crank handle and the shaft which carries the drum on which the line is wound. It is also usual to provide some form of brake or drag whereby free rotating of the drum may be retarded. For deep sea fishing where, as above suggested, great lengths of line are used, it has been proposed to provide a power drive for turning the drum rapidly in retrieving the line, thus speeding up the operation and relieving the fisherman of a fatiguing and time-consuming operation. In the endeavor to satisfy these and other requirements the customary reel of commerce is complicated, heavy and very expensive. It employs gearing which is readily subject to clogging and damage by the intrusion of sand and grit; its mode of operation is often so complicated as to confuse the fisherman in the excitement of a strike and the subsequent playing of the fish, and some of these very expensive reels are insufficiently rugged to stand operating conditions for long, even though they be of large dimensions and undesirably heavy.

Objects of the present invention are to provide a reel of the above type which is rugged and durable but of relatively light weight; which is simple in construction and inexpensive to manufacture; which has effective motion-transmitting means between the actuating handle and the shaft of the drum without recourse to the use of toothed gears; which has provision for hand operation of the reel drum at either of two speeds at will and for the power driving of the drum for retrieving the line; which has very simple control means easily manipulated by one hand, and a very effective brake or drag whose retarding effect may be varied at will. Other and further objects and advantages of the invention will be pointed out in the following more detailed description and by reference to the accompanying drawings wherein Fig. 1 is an elevation showing the right-hand side of the reel, the reel being mounted on a rod whose tip is broken off, the rod and reel being supported upon a stationary member shown in vertical section;

Fig. 4 is a section, to larger scale, on the axis of the reel drum, showing the reel housing in section and with parts omitted;

Fig. 5 is a fragmentary section, to larger scale, on the axis of the small drive pulley;

Fig. 6 is a diagram illustrating the way in which the small pulley is connected to and disconnected from the large pulley; and Fig. 7 is a diagrammatic elevation illustrating a modification.

Figure 2:
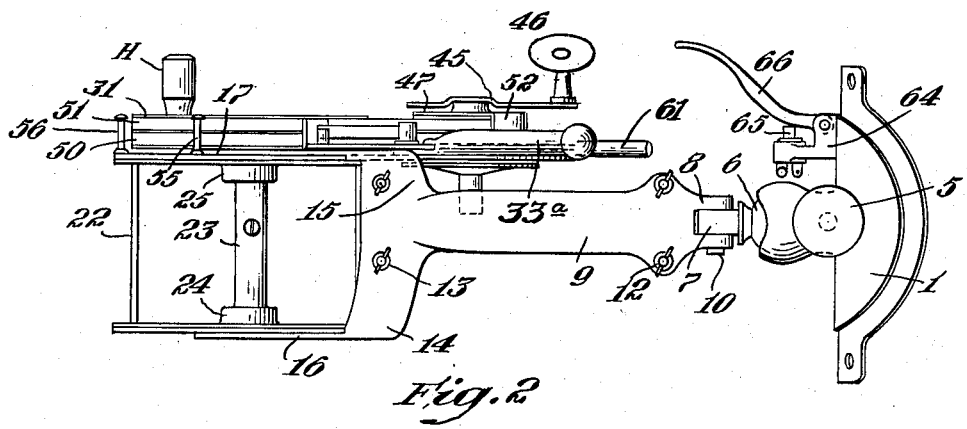
Fig. 2 is a plan view of the reel with the axis of the rod socket horizontal, the rod and stationary support being omitted.

Referring to the drawings, the character C (Fig. 1) indicates a stationary support of any appropriate kind, for example it may represent the forward part of the seat of a chair fixed to the deck of a boat and on which the fisherman is seated while operating the reel. As here illustrated a bracket 1 is mounted on the support C, this bracket having a horizontal flange which rests upon the upper surface of the support C and which is secured to the latter by screws or bolts 2, and a vertical flange which engages the forward surface of the support C and is secured to the latter by screws or bolts 3. This bracket is provided with a hollow, centrally located boss comprising relatively movable parts 4 and 4ª which collectively define a socket for the reception of a ball 6. The parts 4 and 4ª may be drawn together by a screw 5 to clamp the ball and thus fix it in adjusted position. The ball 6 is provided with a rigid tongue member 7 (Fig. 2) which is received between parallel lugs 8 projecting from the lower end of a rod socket 9, the tongue 7 being pivotally secured to the lugs 8 by means of a bolt 10 which may be tightened, if desired, to hold the longitudinal axis of the socket 9 at any desired inclination. The socket 9 is desirably a casting, for example, of aluminum or other light metal, and in transverse section is generally semi-annular with its convexity toward the operator and so shaped as to receive the butt B of the rod R. This socket member 9 is provided near its upper and lower ends respectively with clamping yokes 11 (the lower one being shown in Fig. 1) which embrace the opposite side of the rod from that which is housed in the socket 9, the clamps being drawn tightly about the rod by bolts provided with wing nuts 12 and 13. By loosening these nuts the rod is readily removable from the socket.

In its upper end the socket 9 is widened to provide the lateral shoulders 14 and 15 (Fig. 2) the left-hand shoulder 14 preferably being somewhat wider horizontally than the shoulder 15 so that the axis of the rod is unsymmetrical with respect to the outer ends of these shoulders. The shoulder 14 is provided with an integral, upward extension 16 (Fig. 2) and the wing 15 is provided with a corresponding rigid, upward extension 17, the extensions 16 and 17 being parallel to each other and spaced apart a distance such as to accommodate the reel housing between them. This reel housing comprises a plate 18 (Figs. 3 and 4) associated with the extension 16, and a plate 19 (Figs. 1 and 4) associated with the extension 17. Each of these plates is provided, at its inner side, with a secondary plate 20 having a circular opening for the reception of the corresponding head 21 of the drum on which the line is mounted, the heads being secured to the opposite ends of the hollow shaft 23. The plates 18 and 19 are rigidly connected to each other, in parallel relation, and to the respective extensions 16 and 17 by transversely extending rigid rods 22 which form an open cage about the reel drum. In its left-hand side the plate 19 is provided with an integral tubular boss 27 on which is mounted an anti-friction bearing 28. At its right-hand side the plate 19 is provided with a second integral boss 29 coaxial with the boss 27 and within which is arranged an anti-friction bearing 30. The plate 18 is provided at its right-hand side with an integral tubular boss 27ª on which is mounted the anti-friction bearing 28ª. The reel shaft 26 is arranged with its right-hand portion passing freely through the tubular boss 27 and projecting to the right beyond the bearing 30. To this right-hand end of the shaft 26 there is fixed a pulley 31 which may be secured to the shaft in any appropriate way. Preferably, as illustrated, this pulley 31 has two V grooves in its periphery and has an elongate hub portion 32 which fits within the inner ring of the anti-friction bearing 30.

Figure 3:
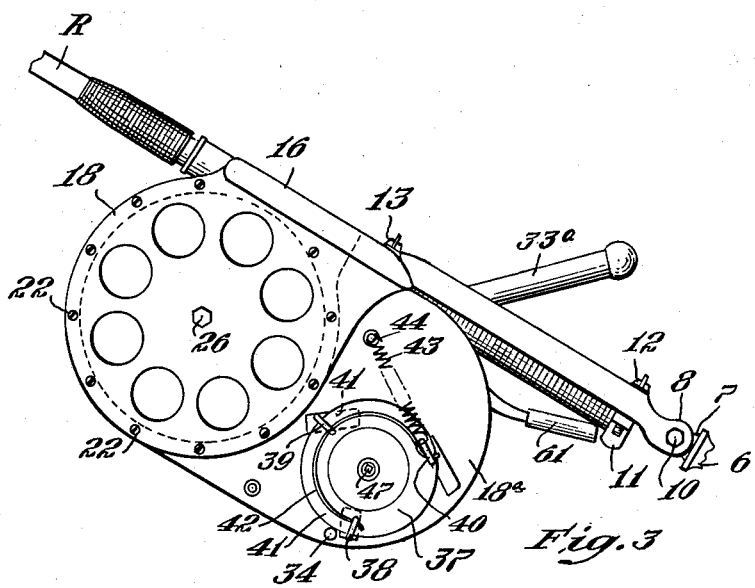
Fig. 3 is an elevation showing the left-hand side of the reel, the upper portion of the rod being broken away and the supporting bracket likewise being broken away.

A supporting plate 33 (Fig. 1) is pivoted to swing on a stud 34 projecting to the right from the plate 19, the part 33 having an elongate actuating handle 33ᵃ by means of which it may be swung on the stud 34. A shaft 35 (Fig. 5) passes through an opening in the part 33 and is received in an elongate bearing sleeve 36 integral with or rigidly secured to a plate 37 disposed at the inner side of the plate 19 of the reel housing. This plate 37 is secured to the part 33 by means of wing bolts 38, 39 and 40 (Fig. 3). These bolts pass through elongate slots 41 in the side plate 19 of the reel housing. To prevent the wing bolts from turning accidentally, a wire, preferably resilient, indicated at 42, is threaded through openings in the heads of these bolts, after they have been adjusted, but by removing this wire, the bolts may be turned for adjustment. A coiled tension spring 43 (Fig. 3), anchored at one end to a fixed stud 44 projecting from the plate 19, is secured at its other end to the wing bolt 40, the spring tending to swing the plate 37 in a counterclockwise direction, as viewed in Fig. 3, about the axis of the pivot stud 34. At its outer end (Fig. 5) the shaft 35 is provided with a crank member 45 fixed to the shaft and having at one end the actuating handle 46, preferably pivotally mounted on a crank pin 46ᵃ fixed to one end of crank member 45. Preferably the member 45 is provided with a balancing element 47 (Fig. 1) at its opposite end. By means of the handle 46, the shaft 35 may be rotated manually.

On the shaft 35, between the member 33 and the crank member 45 there is fixed a pulley 48 (Fig. 5) here shown as a double pulley having two V-grooves 49, the arrangement being such that each of these V-grooves lies in the same plane as a corresponding groove of the pulley 31. Endless V-belts 50 and 51 (Fig. 2) embrace the pulleys and when properly tensioned transmit motion from the smaller pulley 48 to the larger pulley 31, the arrangement being such that when the shaft 35 is rotated, the reel drum is turned at a lesser angular velocity. A desirable ratio of the pulleys 48 and 31 is one-to-three so that one rotation of the shaft 35 turns the reel drum a one-third turn. A rigid housing 52 (Figs. 5 and 6) is secured to the outside of the plate 19 and partially encircles the pulley 48, thus confining the belts 50 and 51 where they pass about the lower part of the pulley 48. Two studs 53 and 54 (Figs. 1 and 6) project from the outer surface of the housing plate 19, these studs being disposed at opposite sides of the belts and being so located that when the belts are operatively tensioned, they are slightly spaced from the studs. Concentric with the axis of the pulley 31 three guard studs 55, 56 and 57 (Figs. 1 and 6) are arranged, these studs being long enough to extend across the widths of the two belts and preferably having headers which overlap the belt 51.

A brake lever 58 (Fig. 1) is pivoted on the stud 53 and carries a brake shoe 59 at its free upper end, this brake shoe being in position to contact the faces of the belts when the lever 58 is swung in a clockwise direction, as viewed in Fig. 1. A flat spring 60 tends to hold the lever 58 in a position such that the brake shoe 59 does not contact the belt. The lever 58 is provided with an elongate, downwardly extending arm 61 providing a handle by which it may be swung about the stud 53. At its intermediate portion, this arm 69 is provided with teeth 62, selectively engageable with a detent 63 fixed to the swinging support 33.

By swinging the handle 33ᵃ downwardly, that is in a counterclockwise direction as viewed in Fig. 1, the detent 63 is caused to travel downwardly along the series of teeth 62, thus moving the axis of the shaft 35 (Fig. 5) downwardly and away from the axis of the reel drum, thereby tensioning the belts. When the belts have been properly tensioned, the detent 63 will hold the parts in the adjusted position until the handle 61 is swung upwardly, that is clockwise, as viewed in Fig. 1, thus disengaging the detent 63 from the teeth 62, whereupon the spring 43 (Fig. 3) automatically swings the support 33 upwardly about the stud 34, thus decreasing the belt tension. In Fig. 6, the small pulley 48 is shown, in full lines, in the belt-tensioning position, the belt 50 extending in straight runs between its points of tangency with the pulleys 48 and 31. In broken lines, the pulley 48 is shown in position for slackening the belt tension. As the pulley 48 moves up toward the broken line position 50ᵃ, the natural stiffness of the belts tends to separate them from the pulley 31, this effect being increased by the action of the guard 52 which follows the pulley 48 and thus pushes the belts upwardly, thus preventing the belts from dropping below the pulley 48. The result of this action is that while the lower portion of the belt extends in substantially straight runs from its tangent points with the pulley 48 to points of contact with the respective studs 53 and 54, it bulges outwardly in opposite directions above the studs 53 and 54 and thus away from the pulley 31 so that the belts are no longer capable of transmitting motion from the pulley 48 to the pulley 31. In fact, the belts move out of contact with pulley 31, so that the latter is free to rotate without frictional retardation by the belt. The studs 55, 56 and 57 help to keep the loosened belts in concentric relation to pulley 31, thus insuring uniform spacing of the belts from the pulley.

The inner end of the shaft 35, as shown in Fig. 5, is provided with a suitably shaped portion 47 (for example polygonal) for the reception of a coupling, by means of which a flexible drive shaft (not shown) may be attached to the shaft 35, such drive shaft extending from a power source, for example an electric motor (not shown) conveniently mounted on the deck of the boat. For controlling such a power drive (useful in retrieving long lengths of line) a switch 64 (Fig. 2) may be provided, the switch casing being mounted on the bracket 1 and carrying a switch, for example a switch of the micro type having an actuating pin 65 which may be moved to close the motor circuit by means of a lever 66 conveniently located to be actuated by the knee of the fisherman while he is seated on the support C with one leg disposed on either side of the bracket 1. In the modification suggested in Fig. 7, the reel is in all respects like that above described, except that on the left-hand side of the extension 19 of the reel housing there is mounted a small electric motor M whose shaft is flexibly connected to the shaft 35 of the pulley 48.

In the operation of the apparatus, and assuming that the flexible power driven shaft has been connected at the point 47 to the shaft 35 (or that the motor M of Fig. 7 has been provided) but that the motor circuit is open, and assuming that a length of line extends from the reel drum through appropriate guides to the tip of the rod and thence to a lure in the water, and assuming that a fish strikes, the operator may, if he so desires, first apply tension to the line by rotating the reel drum directly by means of a handle H (Fig. 1) projecting from the right-hand face of the pulley 31. If the tension becomes too great to be controlled by a one-to-one gear ratio, the operator may move the handle 33ᵃ downwardly thus placing the belts under tension and may then turn the drum for keeping the line taut by means of the handle 46, thus giving the fisherman the advantage of a three-to-one ratio (providing that is the ratio of the pulleys which has been adopted) for tensioning the line. If the fisherman desires still further to increase the tension, he may lift the handle 61, thus applying the brake shoe 59 to the belts and in this way opposing as great a frictional resistance as he may wish to the free rotation of the reel drum. These various operations may be availed of according to the progress of the playing of the fish, the several operations being readily controlled by one hand of the operator who may let out line or pull it in, as circumstances may indicate to be desirable.

If the fish escape or for other reason it be desired to retrieve the line, the operator may swing the lever 66 so as to actuate a switch 64 and close the motor circuit, at the same time pushing the handle 33ª downwardly to tension the belts, the motor thereupon drives the shafts at high speed, thus reeling in the line rapidly and in this way relieving the operator of the trouble and loss of time occasioned in the hand-retrieving of great lengths of empty line.

As above noted, the axis of the rod is nearer to the right-hand side of the reel housing than to the left-hand side, this arrangement being desirable to counterbalance the weight of the parts which are mounted on the right-hand side of the reel housing. It will be observed that the entire reel structure is of very simple form, comprising relatively few parts and that no toothed gears or other metallic gearing is employed in providing for the desired motion transmission. No fragile or unduly small parts are included, and while the entire device may be built from light metal so as to avoid undue weight, nevertheless the device is so designed that the structure is very rigid and durable; provides a firm mode of securing the reel to the rod without necessitating the employment of a rod of special form; and provides the fisherman with the maximum facilities for playing the fish and for handling great lengths of line.

While the supporting bracket here illustrated is desirable, it is obvious that the rod socket may be supported in brackets of other types and that while the universal adjustment provided by the bracket shown is useful, it is not essential to the operation of the reel proper.

A desirable embodiment of the invention has been illustrated by way of example but it is to be understood that the invention includes all modifications falling within the scope of the appended claims.

I claim:

1. A fishing reel comprising a shaft having a reel drum mounted thereon, a pulley on said shaft, a support movable in a plane perpendicular to the axis of said pulley, a second pulley, of smaller diameter than the first, mounted on the support to turn about an axis parallel to that of the first pulley, an endless belt embracing the two pulleys, a housing carried by the support, the housing comprising an arcuate portion concentric with the smaller pulley and spaced from the latter sufficiently to admit the belt between the pulley and said arcuate portion, a plurality of fixed studs spaced circumferentially about the larger pulley and located at the outside of the belt, and other fixed studs arranged for engagement with the outer surfaces of the respective runs of the belt which extend between the pulleys, said arcuate portion of the housing and said studs cooperating, when the support is moved so that the smaller pulley moves toward the larger pulley, to cause the belt completely to separate from the larger pulley.

2. A fishing reel comprising a shaft having a reel drum mounted thereon, a pulley on said shaft, a support movable in a plane perpendicular to the axis of said pulley, a second pulley of smaller diameter than the first mounted on the support to turn about an axis parallel to that of the first pulley, an endless belt embracing the two pulleys, manually actuable means for moving the support in one direction to tension the belt, spring means tending to move the support in the opposite direction thereby to slacken the belt, means, comprising a manually actuable spring pressed lever provided with a series of teeth and a detent carried by the support, for automatically locking the support in adjusted position, and belt-engaging means operative to keep the belt substantially in contact with the smaller pulley whereby, when the latter is moved toward the larger pulley, the belt is spaced from the larger pulley.

3. A fishing reel comprising a reel drum, a pulley coaxial with and spaced relatively to the drum, a second pulley of smaller diameter than the first having its axis parallel to that of the first pulley, an endless belt embracing the pulleys, a movable support for the smaller pulley whereby the latter may be moved toward and from the larger pulley, a spring tending to move the support so as to carry the smaller pulley toward the larger pulley and thereby slacken the belt, a brake shoe for applying retarding force to the belt, a lever upon which the brake shoe is mounted, a spring tending to swing the brake lever to inoperative position, a handle for actuating the brake lever, ratchet teeth on the lever, and a detent, carried by the support, which is engageable at will with a selected one of said ratchet teeth thereby to hold the support in belt tensioning position.

4. A fishing reel comprising a reel drum, a pulley coaxial with and fixed relatively to the drum, a second pulley of smaller diameter than the first having its axis parallel to that of the first pulley, an endless belt embracing the pulleys, a movable support for the smaller pulley whereby the latter may be moved toward and from the larger pulley, a spring tending to move said support so as to carry the smaller pulley toward the larger pulley and thereby slacken the belt, a handle for moving the support, a lever carrying a brake shoe for applying retarding force to the belt, a spring tending to move said lever to inoperative position, a handle for actuating said brake lever, said latter handle being located closely adjacent to the handle for moving the support, the brake lever having thereon a series of ratchet teeth, and the support having a detent engageable with a selected one of said ratchet teeth.

5. A fishing reel comprising a reel drum, a pulley coaxial with and fixed relatively to the drum, a second pulley of smaller diameter than the first having its axis parallel to that of the first pulley, an endless belt embracing the pulleys, a pivoted support for the smaller pulley whereby the latter may be moved bodily toward and from the larger pulley, a spring tending to rock the support in a direction to slacken the belt, manually adjustable means to rock the support in the opposite direction thereby to tension the belt, a brake for retarding rotation of the reel drum, a manually actuable lever for applying the brake, and means for locking the support in a position such that the belt is tensioned thereby to transmit motion from one pulley to the other, said locking means comprising a series of teeth carried by the brake actuating lever and a detent carried by the support and which is engageable with any selected one of said teeth.

References Cited in the file of this patent

UNITED STATES PATENTS

| 166,468 | King | Aug. 10, 1875 |
| 306,677 | Culver et al. | Oct. 14, 1884 |
| 425,955 | Pierce | Apr. 15, 1890 |
| 488,678 | Leprohon | Dec. 27, 1892 |
| 724,465 | Haas | Apr. 7, 1903 |
| 1,062,488 | McCluer et al. | May 20, 1913 |
| 1,228,606 | Sanders | June 5, 1917 |
| 1,507,638 | Verhey | Sept. 9, 1924 |
| 1,580,986 | Aberson | Apr. 13, 1926 |
| 2,002,424 | Weaver | May 21, 1935 |
| 2,242,972 | Fraim | May 20, 1941 |
| 2,272,981 | Nelson | Feb. 10, 1942 |
| 2,458,767 | Cooper | Jan. 11, 1949 |
| 2,492,819 | Schulz | Dec. 27, 1949 |
| 2,498,611 | Staver | Feb. 21, 1950 |
| 2,523,592 | Powell et al. | Sept. 26, 1950 |
| 2,580,130 | Rowdon | Dec. 25, 1951 |
| 2,643,092 | Paulette | June 23, 1953 |

FOREIGN PATENTS

| 163,088 | Great Britain | May 19, 1921 |
| 426,430 | Great Britain | Apr. 3, 1935 |